3,551,830
GLOSSY MICROPOROUS SHEET MATERIAL

George R. Hodge, Old Hickory, Tenn., and Angelos Vlasus Patsis, New Paltz, N.Y., assignors to E. I. du Pont de Nemours and Company, Wilmington, Del., a corporation of Delaware
No Drawing. Filed Oct. 22, 1968, Ser. No. 769,708
Int. Cl. B44d 1/32; D06n 3/08
U.S. Cl. 117—76                                    6 Claims

ABSTRACT OF THE DISCLOSURE

A vapor permeable glossy sheet material of a microporous fibrous substrate which is either natural leather or a synthetic leather that is coated with a glossy vapor permeable coating that is free from a surface tack in which the polymer of the coating consists essentially of an isocyanate terminated polyurethane, a vinyl chloride polymer and a reactive polysiloxane.

BACKGROUND OF THE INVENTION

This invention is concerned with non-porous vapor permeable sheet materials useful for making shoe uppers, and in particular, sheet materials of this type which are highly glossy. These materials are also used to make ladies' handbags, purses, belts and other articles requiring strength, flexibility and a durable highly glossy surface.

A variety of materials having a high gloss finish have been commercially available for several years. Most of these materials are both non-porous and impervious to vapors and the remainder have vapor permeability values substantially less than the minimum required for comfortable shoe uppers. Also, flexibility and scuff resistance of most of these materials is so low that they soon crack or lose their glossy appearance, or both.

In addition, these materials possess a surface tack which causes, for example, shoe uppers to adhere to one another when the glossy surfaces are placed in contact with each other as occurs when one walks or sits. This surface tack is not only disconcerting to the wearer of the shoes and increases the scuffing of the shoe, but is also dangerous. There is at least one instance recorded where a woman's shoes have stuck together causing the wearer to fall and injure herself.

This invention provides a durable highly glossy non-porous vapor permeable sheet material free from these deficiencies of the prior art materials, in particular free from surface tack and is eminently suitable for shoe uppers, ladies' handbags, belts and other high style accessories. The sheet material of this invention can be conveniently manufactured on conventional equipment.

STATEMENT OF THE INVENTION

A vapor permeable glossy sheet material of a microporous fibrous substrate that has firmly adhered thereto a glossy vapor permeable non-porous coalesced coating which is substantially free of a light scattering gas/polymer interface and pores visible with a 300× power microscope which coating consists essentially of (1) about 70 to 99.9% by weight based on the total weight of the polymer of the coating of an isocyanate terminated polyurethane which is the reaction product of an organic diisocyanate and an active hydrogen containing polymer which is either a poly(alkyleneether) glycol or a hydroxy terminated polyester;

(2) up to 25% by weight based on the weight of the polymer of the coating of a vinyl chloride polymer; and (3) 0.1–1% by weight based on the weight of the polymer of said coating of a reactive polysiloxane of the formula

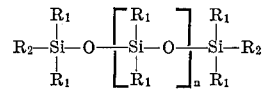

wherein $R_1$ is either —H or an alkyl group having 1–4 carbon atoms, $R_2$ is either —NCO, —$NH_2$, —H or —OH and $n$ is an integer sufficiently large to give said polysiloxane an inherent viscosity of 0.1–2.0 at 25° C.

DESCRIPTION OF THE INVENTION

The term "non-porous" as used in describing this invention refers to a sheet material or a coating of a synthetic polymeric material free from visible pores (as viewed by the naked eye or with a microscope of up to 300× power), which polymeric material in the form of an unsupported film one mil thick does not contain a significant number of light scattering gas/polymer interfaces.

The term "porous" refers to coatings and sheet materials which do not meet the test of non-porosity as set forth above. "Microporous" refers to porous materials, the pores of which are not discernible to the naked eye.

The term "glossy," as used to describe this invention, refers to a surface having a reflectance of at least 50% at 60° in accordance with ASTM Test No. D–523–62T. All of the products of this invention have at least this minimum degree of reflectance and some have a reflectance of over 94% on this basis. Preferably, the products of this invention have a 60° gloss of 80 to 98.

Water vapor permeability value of the novel sheet material for this invention is at least 600, preferably 1200 to about 2100, and preferably, higher. Water vapor permeability of the novel sheet material is determined by sealing the sheet on top of a cup containing $CaCl_2$. This sealed cup is stored at 90% relative humidity and the weight increase due to moisture permeating through the material is determined and the water vapor permeability is calculated in $$\frac{\text{grams of water}}{100 \text{ square meters of material/hour}}$$

It is important that the vapor permeable non-porous synthetic polymeric coating applied to the microporous fibrous substrate have a thickness of about 0.1 to about 1.5 mil, and preferably, about 0.2–0.4 mil. This coating can be applied as a single layer or several layers so long as the total thickness does not exceed about 1.5 mil. When the coating comprises more than one layer, these may be the same or different polymeric materials. In accordance with a particularly preferred embodiment of this invention, the coating consists of two layers, each of a different polymeric material and with the embossing step taking place between application of the coatings.

Coating of polymeric materials can be applied to the microporous fibrous substrate by any convenient procedure such as dip coating, spray coating, roller coating, doctor blade coating, lamination or the like so long as the coating has a uniform thickness. These coatings may be clear, but are preferably, pigmented and it is a particularly surprising attribute of this invention that products having coatings containing as much as 70% pigments by weight exhibit a highly glossy appearance.

The glossy vapor permeable coating of the novel sheet material of this invention consists essentially of 70 to 99.9% by weight based on the total weight of the polymer of the coating, and preferably, 90–98% by weight, of an isocyanate terminated polyurethane. The isocyanate terminated polyurethane is the reaction product of an organic diisocyanate and an active hydrogen containing polymer material which is either a poly(alkyleneether) glycol or a hydroxy terminated polyester.

The preferred polyurethanes are prepared with at least a major portion of an aromatic, aliphatic or cycloaliphatic diisocyanates or mixtures thereof; for example, tolylene-2,4-diisocyanate,
tolylene-2,6-diisocyanate,
m-phenylene diisocyanate,
biphenylene-4,4'-diisocyanate,
methylene bis-(4-phenyl isocyanate),
4-chloro-1,3-phenylene diisocyanate,
naphthalene-1,5-diisocyanate,
tetramethylene-1,4-diisocyanate,
hexamethylene-1,6-diisocyanate,
decamethylene-1,10-diisocyanate,
cyclohexylene-1,4-diisocyanate,
methylene bis-(4-cyclohexyl isocyanate) and
tetrahydronaphthalene diisocyanate.

Arylene diisocyanates, such as tolylene-2,4-diisocyanate and tolylene-2,6-diisocyanate, are preferred.

The poly(alkyleneether) glycols used for the preferred polyurethanes contain $C_2$–$C_{12}$ alkylene segments. The most useful polyglycols have a molecular weight of 300 to 5000, preferably 400 to 2000; some of these polyglycols are, for example, polyethyleneether glycol, polypropyleneether glycol, polytetramethyleneether glycol, polyhexamethyleneether glycol, polydecamethyleneether glycol, polydodecamethyleneether glycol, and mixtures thereof. Polyglycols containing several different radicals in the molecular chain, such as the compound $HO(CH_2OC_2H_4O)_nH$ wherein $n$ is an integer greater than 1, can also be used.

One preferred polymeric material useful in forming glossy non-porous vapor permeable coatings in accordance with this invention is the polyetherurethane formed by reacting poly(propyleneether) glycol, molecular weight of about 1000, with a mixture of 2,4- and 2,6-toluene diisocyanate in a solvent, such as cellosolve acetate. The resulting isocyanate terminated prepolymer is then cross-linked with water in the presence of dibutyltin dilaurate dissolved in cyclohexanone for coating purposes.

Hydroxyl terminated polyesters can be used instead of or in conjunction with the poly(alkyleneether) glycols, particularly those formed by reacting acids, esters or acid halides with glycols. Suitable glycols are polyalkylene glycols, such as methylene-, ethylene-, propylene-, tetramethylene-, decamethylene glycol; substituted polyalkylene glycols, such as 2,2-dimethyl-1,3-propanediol; cyclic glycols, such as cyclohexanediol and aromatic glycols, such as xylylene glycol. These glycols are reacted with aliphatic, cycloaliphatic or aromatic dicarboxylic acids or lower alkyl esters or ester forming derivatives to produce relatively low molecular weight polymers and molecular weights like those indicated for the polyalkyleneether glycols. Acids for preparing such polyesters are succinic, adipic, suberic, sebacic, phthalic, terephthalic, isophthalic and hexahydroterephthalic acids and the alkyl and halogen substituted derivatives of the acids.

A highly useful and preferred polyesterurethane for preparing the glossy non-porous vapor permeable coatings of this invention is prepared in accordance with Schollenberger U.S. Pat. 2,871,218, issued Jan. 27, 1959, and the disclosure of this patent is hereby incorporated into this specification and made a part thereof as illustrating useful polymeric coating materials.

One particularly useful type of polyesterurethane for the glossy coatings of this invention is prepared by reacting (1) a linear hydroxyl terminated polyester of a 4–10 carbon atom saturated aliphatic glycol and a saturated aliphatic dicarboxylic acid or an anhydride thereof, with (2) a phenyl diisocyanate, and (3) saturated aliphatic glycol having 4–10 carbon atoms. One preferred polyurethane of this type for use as the glossy coating is the reaction product of hydroxyl terminated poly(tetramethylene adipate), diphenyl methane-p,p'-diisocyanate and 1,4-butane diol.

Up to about 25% by weight, based on the total weight of the film-forming polymer, of a vinyl chloride polymer is used in the glossy vapor permeable coating of the novel sheet material of this invention. For best results, about 2–10% by weight vinyl chloride polymer is used. The term vinyl chloride polymer is used herein in a broad sense and includes homopolymers of vinyl chloride, copolymer of vinyl chloride, containing at least 70% by weight of vinyl chloride, as well as mixtures of homopolymers and copolymers of vinyl chloride. Monomers which are polymerizable with vinyl chloride to form copolymers useful in this invention are, for example, vinyl acetate, vinyl alcohol, vinylidene chloride, acrylonitrile and maleic, fumaric and acrylic esters. One preferred copolymer contains 80–90% by weight vinyl chloride and 20–10% by weight vinyl acetate.

The reactive polysiloxane useful for forming the glossy coating for the novel sheet materal of this invention is present in about 0.1–1.0% by weight, based on the weight of the film-forming polymer, and preferably for best results is present in about 0.2–0.5% by weight. The polysiloxane has reactive end groups which may be either —H, —NCO, —OH or —NH₂, which chemically bond the polysiloxane to the polyurethane used in the coating of the novel sheet material of this invention. Preferably, the reactive end group is —NH₂.

The polysiloxanes useful for forming the glossy coating of the novel sheet material of this invention are of the following formula:

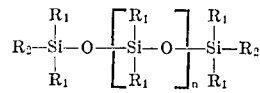

wherein $R_1$ is either H, or an alkyl group of 1–4 carbon atoms, $R_2$ is the aforementioned reactive end group and $n$ is an integer sufficient to give an inherent viscosity at 25° C. of about 0.1–2.0, preferably 0.5 to 1.0. Preferably, for best results, $R_1$ is $CH_3$ and $R_2$ is —$(CH_2)_2NH_2$.

Any of the well known pigments, extender pigments and dyes can be added to the polymer to form the glossy coating of the novel microporous sheet material of this invention to give the desired color to the product. About 10–50% by volume pigment, and preferably, 15–25% by volume pigment, can be used. Typically useful pigments are, for example, metal oxides, such as titanium dioxide, metal hydroxides, chromates, silicates, sulfides, sulfates, carbonates, carbon blacks, organic dyes, such as β-copper phthalocyanine, flakes and metal flake pigments.

The solvents used for the novel coating composition used to form the novel glossy sheet material of this invention should be of such a character as not to degrade the microporous fibrous substrate. Coating compositions contain about 5–25% by weight polymer solids, i.e., the aforementioned blend of polyurethane, vinyl chloride polymer and polysiloxane used for the glossy coating. Preferably, a coating composition of about 10–20% by weight polymer solids are used. Typically useful solvents that can be used with a microporous sheeet material of a polyurethane are methyl ethyl ketone, tetrahydrofuran, cyclohexanone, acetone, mixtures of toluene/ethanol, benzene/methanol, toluene/isopropyl alcohol, benzene/t-butyl alcohol, xylene/n-butyl alcohol, xylene/methyl Cellosolve, xylene Cellosolve, benzene/methyl isobutyl carbinol, methylene chloride/carbitol, methylene chloride/n-butanol and the like.

After the microporous fibrous substrate is coated with the above described composition, the glossy surface on the novel sheet material of this invention is obtained preferably by embossing the coated surface in accordance with the processes of U.S. Pat. 2,801,949 to Bateman Aug. 6, 1957, and U.S. Pat. 3,157,723 to Hochberg Nov. 17, 1964. These enhance the degree of gloss of the sheet material and improve its jetness. In accordance with this procedure, a sheet material having a polymeric coating is placed in contact with a smooth film of cellophane, cellulose acetate, polyethylene terephthalate or the like and passed through the nip of the embossing cylinder and the pressure bladder described in U.S. Pat. 3,157,723 with the smooth film in contact with the coating of the fabric. The pressure roller in contact with the film can be engraved or smooth depending upon whether a pattern is desired on the surface of the final product. In any event, the smooth film by being in contact with the polymeric coating of the microporous material during passage between the aforementioned nip of the embossing roller and the pressure bladder imparts to the coating an extremely high gloss which is revealed in all its brilliance upon the removal of the film from the coated microporous substrate. So far as is known, no other convenient means is available at the present time to produce a vapor permeable non-porous synthetic polymeric coated material having such a high gloss. These products are eminently suitable for making shoe uppers and other accessories.

The microporous fibrous substrate used to form the novel glossy sheet material of this invention can be natural leather or a synthetic microporous sheet material. Preferably, a synthetic microporous fibrous substrate is used which preferably is formed by the process of one of the following patents which are hereby incorporated by reference: Johnston et al. U.S. 3,000,757, issued Sept. 19, 1960; Holden U.S. 3,100,721, issued Aug. 13, 1963; Yuan 3,190,766, issued June 22, 1965; Holden U.S. 3,208,875, issued Sept. 28, 1965; Hulslander et al. U.S. 3,284,274, issued Nov. 8, 1966; Patsis U.S. 3,364,098, issued Jan. 16, 1968. One preferred microporous sheet material is prepared according to U.S. patent application, Ser. No. 634,465, to Bateman, filed Apr. 28, 1967, and the disclosure of this application is hereby incorporated by reference.

The preferred microporous fibrous substrate of the novel glossy, vapor permeable microporous product of this invention comprises a porous web of a synthetic polymeric material reinforced with fibers and having in firm adherence thereto a microporous synthetic polymer coating. Polymers that are useful for forming the microporous coating of the substrate have a secant tensile modulus at 5% elongation of above about 600 pounds per square inch (p.s.i.) during the entire processing cycle of making the microporous material, i.e., from the time the polymer is coagulated into a microporous structure until it is dried. If the microporous structure of the coating of the substrate is formed from polymers which in consolidated form have a secant tensile modulus below about 600 p.s.i., the microporous structure collapses as the liquid is being removed or after the liquid is removed from the micropores of the structure so that a relatively impermeable product is formed. Preferably, the secant tensile modulus during the cycle of forming the microporous coating of the substrate is about 600–25,000 p.s.i., and more preferably, about 800–10,000 p.s.i., and still more preferably, about 800–3000 p.s.i. The secant tensile modulus is the ratio of the stress to the strain at 5% elongation of the specimen determined from the tensile stress-strain curve and is expressed as force per unit area, e.g., pounds per square inch. The secant tensile modulus measurement is carried out according to ASTM D-882-64-T modified as described below.

The secant tensile modulus of the polymer useful for forming the microporous coating of the substrate of this invention is determined by forming a 5 to 20 mil continuous void-free polymer film from the polymeric solution used in the process to form the coating. The film is formed by casting this polymer solution on a glass plate and the solution is then dried, e.g., at 105° C. for 90 minutes.

The stress-strain curve which is necessary to calculate the secant tensile modulus of the polymer used in this invention to form the microporous coating on the substrate is preferably obtained on an Instron Tensile Tester using a ½ inch wide specimen cut from the above prepared polymeric film with about one inch between grips. The following settings are preferably used on the Instron Tester to obtain a stress-strain curve: chart speed of 10 inches per minute, cross head speed of 1 inch per minute, and a full scale load of 2 to 5 pounds.

The secant tensile modulus is obtained from the chart of the force vs. strain curve by drawing a line at 5% elongation (strain) parallel to the force axis of the chart. The point at which this line intersects the force/strain curve defines the force in pounds necessary to elongate the specimen 5%. This force value is divided by the initial cross-sectional area of the specimen to give the corresponding stress value in pounds per square inch. This stress value is divided by the strain (0.05) to give the secant tensile modulus.

To initially select polymers useful for forming the coating of the microporous substrate used in this invention, the test temperature is usually room temperature, about 23° C. At this temperature, polymers potentially useful in this invention have a secant tensile modulus at 5% elongation above about 600 p.s.i. However, as previously stated, polymers useful in this invention have a secant tensile modulus at 5% elongation of above about 600 p.s.i. during the entire process cycle; therefore, the highest temperature used during the process for forming the microporous coating should be used as the test temperature, e.g., if the drying temperature is 120° C., the secant tensile modulus of a potentially useful polymer should be tested at 120° C. and at this test temperature, the secant tensile modulus at 5% elongation should be above about 600 p.s.i.

Preferably, the microporous substrate material of this invention utilizes a microporous polyurethane polymer coating. One process for making a microporous fibrous substrate coated with a microporous polyurethane polymer is disclosed in the aforementioned U.S. Pat. 3,100,721, to E. K. Holden. Polymers useful in forming the microporous coating for the substrate used in this invention have a secant tensile modulus of above about 600 p.s.i. and are polyurethanes either alone or in a mixture with other polymers, such as a vinyl chloride polymer. One class of polyurethanes useful in this invention for forming the microporous coating of the substrate are polyureas, that is, polyurethanes containing the recurring structural unit:

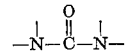

The prepolymers for the polyurethanes are prepared by mixing one or more polyalkyleneether glycols or hydroxyl-terminated polyesters with a molar excess of organic diisocyanate and heating the mixture to a temperature of about 50–100° C. to form a prepolymer having terminal —NCO groups. An alternate procedure is to react the diisocyanate with a molar excess of polyalkyleneether glycol or polyester, then cap the resulting product, that is, react it with more diisocyanate to form a prepolymer having terminal —NCO groups.

The preferred polyurethanes used for making the microporous coating of the substrate that is utilized in this invention are the chain-extended polyurea type which are formed from aliphatic polyol segments which include the polyalkyleneether glycols having $C_3$–$C_{12}$ alkylene segments and the hydroxyl-terminated polyester of $C_3$–$C_{12}$ acyclic dicarboxycyclic acid and $C_3$–$C_{12}$ alkylene glycol. Polyalkyleneether glycols are the preferred active hydrogen containing material for the prepolymer formation. The most useful polyglycols have a molecular weight of 300 to 5000, preferably 400 to 2000; some of these polyglycols are, for example, polyethyleneether glycol, polypropyleneether glycol, polytetramethyleneether glycol, polyhexamethyleneether glycol, polydecamethyleneether glycol, polydodecamethyleneether glycol, and mixtures thereof. Polyglycols containing several different radicals in the molecular chain such as the compound HO(CH$_2$OC$_2$H$_4$O)$_n$H wherein $n$ is an integer greater than 1 can also be used.

The preferred polyurethanes used for making the microporous coating of the substrate utilized in this invention are prepared with at least a major portion of an aromatic, aliphatic or cycloaliphatic diisocyanates or mixtures thereof; for example, tolylene-2,4-diisocyanate,
tolylene-2,6-diisocyanate,
m-phenylene diisocyanate,
biphenylene-4,4'-diisocyanate,
methylene-bis(4-phenyl isocyanate),
4-chloro-1,3-phenylene/diisocyanate,
naphthalene-1,5-diisocyanate,
tetramethylene-1,4-diisocyanate,
hexamethylene-1,6-diisocyanate,
decamethylene-1,10-diisocyanate,
cyclohexylene-1,4-diisocyanate,
methylene-bis(4-cyclohexyl isocyanate), and
tetrahydronaphthalene diisocyanate.

Polyesters can be used to form the polyurethane polymer for the microporous coating of the substrate utilized in this invention instead of or in conjunction with the polyalkyleneether glycols, particularly those polyesters formed by reacting acids, esters or acid halides with glycols. Suitable glycols are polyalkylene glycols, such as methylene-, ethylene-, propylene-, tetramethylene-, decamethylene glycol; substituted polyalkylene glycols, such as 2,2-dimethyl-1,3-propanediol; cyclic glycols, such as cyclohexanediol and aromatic glycols, such as xylylene glycol. Aliphatic glycols are generally preferred when maximum product flexibility is desired and when making microporous articles. These glycols are reacted with aliphatic, cycloaliphatic or aromatic dicarboxylic acids or lower alkyl esters or ester forming derivatives to produce relatively low molecular weight polymers, preferably having a melting point of less than about 70° C., and molecular weights like those indicated for the polyalkyleneether glycols. Acids for preparing such polyesters are succinic, adipic, suberic, sebacic, terephthalic and hexahydroterephthalic acids and the alkyl and halogen substituted derivatives of the acids.

Hydrazine is preferred as the chain-extending agent for the preferred polyurethanes used to make the microporous coating of the substrate utilized in this invention, although C$_1$-C$_6$ (including cycloaliphatic) diamines, such as ethylene diamine, hexamethylene diamine and dimethyl piperazine and 1,4-diamino/piperazine can also be used advantageously either alone or in a mixture with hydrazine.

A particularly preferred chain-extender which is reacted with the isocyanates terminated prepolymer has the structural formula

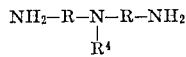

wherein R is (CH$_2$)$_n$ and $n$ is from 1–4, and R$^4$ is an alkyl group of 1–4 carbon atoms. The preferred compound is N-methylamino-bis-propylamine. It is usually best to use a blend of a minor proportion, preferably about 5–30 mole percent, of the above preferred chain-extender with a major proportion, about 95–70 mole percent, of another compound having two amino nitrogen atoms, each nitrogen having an active hydrogen atom bonded thereto, preferably hydrazine. Other chain-extending compounds which can be used along with the preferred compound are mono-substituted hydrazines, dimethyl piperazine, 4-methyl-m-phenylene-diamine, m-phenylene-diamine, 4,4'-diamino-diphenyl-methane, 1,4-diamino-piperazine, ethylene diamine and mixtures thereof.

Mixtures of at least one vinyl polymer with a polyurethane can be used to prepare the coating of the substrate used in this invention. Such mixtures, preferably containing polyvinyl chloride as the vinyl polymer, can contain from 1 to 2% of vinyl chloride polymer to about 50% thereof.

The porous web of the microporous substrate is preferably a fibrous mat impregnated with a polymeric material. Such fibrous mats are, for example, wovens, such as twills, drills and ducks; knitted materials, such as jersey and tricot, felts, needle punched batts. The choice of the particular fibers from which the mat is made is not critical; they include those made from polyamides, polyesters, polyesteramides, acrylic polymers, viscose rayon, wool, cotton, glass and mixtures thereof. Elastomeric fibers and elastic fibers can also be used. These mats are preferably impregnated with any of the aforementioned polymers used for the microporous coatings using a process which will give a porous mat. Preferably a binder to fiber ratio of about 0.25/1 to 1/1 is used. A porous nonwoven, needle punched, heat shrunk mat of polyethylene terephthalate fibers impregnated with one of the aforementioned polyurethanes is particularly preferred. The preferred mat contains about 30–60% fiber by weight and about 70–40% of a polyurethane polymer.

The examples which follow illustrate the invention. All quantities are on a weight basis unless otherwise indicated.

EXAMPLE 1

Coating Composition A is prepared by blending together the following ingredients:

| | Parts by weight |
|---|---|
| Methyl ethyl ketone | 535.0 |
| Vinyl chloride copolymer solution (20% polymer solids of vinyl chloride/vinyl acetate, weight ratio 85/15 in methylethyl ketone) | 9.0 |
| Urethane polymer solution [55% polymer solids in Cellosolve acetate, wherein the polymer is an isocyanate terminated polyurethane toluene diisocyanate and (polypropyleneether) glycol] | 150.0 |
| Dibutyl tin laurate solution (4.5% solids in cyclohexanone) | 15.0 |
| A —NCO terminated polysiloxane having an inherent viscosity at 25° C. of about 0.5 | 0.3 |
| Total | 709.3 |

The polysiloxane is blended with methyl ethyl ketone and the vinyl chloride is slowly added with constant agitation. The urethane polymer solution is then added and the ingredients are mixed for 10 minutes. The dibutyl tin laurate solution is added and the ingredients are thoroughly blended for 5 minutes. The resulting coating composition has a polymer solids content of about 14%.

Coating Composition B which is capable of forming a glossy vapor permeable coating is prepared by dissolving 4.5 parts by weight of a polyesterurethane and about 2 parts by weight of a pigment composition in about 93.5 parts by weight of tetrahydrofuran. The polyesterurethane is a commercially available product from the B. F. Goodrich Company under the trademark "Estane 5707–F1," and is believed to be prepared according to the process of U.S. Pat. 2,871,218, and is believed to be the reaction product of hydroxyl terminated poly(tetramethylene adipate), diphenylmethane - p,p' - diisocyanate and 1,4-butane diol. The pigment composition consists of 20% by weight of very finely ground carbon black having an average particle size of about 0.1 micron, 12% by weight dibutylphthalate and 68% by weight of a copolymer of vinyl chloride/vinyl acetate, weight ratio 85/15.

A roll of microporous polyurethane foundation material about 42 inches wide is made in accordance with the teachings in Example 1 of U.S. patent application, Ser. No. 634,465, to Bateman, filed Apr. 28, 1967. The resulting product is a porous impregnated non-woven web about 50 mils thick of 0.5 denier heat shrunk polyethylene terephthalate fibers impregnated with a microporous polyurethane polymer have an interlayer fabric and that has a uniform and firmly adhered layer on one side about 10 mils thick of a microporous polyurethane polymer.

The microporous foundation material is then dyed black with Nigrasine dye (C.I. Acid Black 2) according to the process of Manwarning U.S. 3,337,289, issued Aug. 22, 1967. The microporous sheet material is dip-coated with Coating Composition B. The sheet material is passed around a roll in the dip tank containing Coating Composition B with the substrate side contacting the roll and the microporous polyurethane surface exposed to the coating composition. The manner in which the material wraps around the roll and the level of the coating composition is selected so the mixture contacts only the microporous coated side and edges of the sheet material. A coating line speed of about 8 yards per minute is used which results in a coating weighing about 0.20 ounce per square yard (dry weight) after the material is air dried in an oven at about 115° C.

The coated material is then embossed by placing a sheet of polyethylene terephthalate in contact with the dried coating and pressing it according to the process of U.S. Pat. 2,801,949 and using the equipment of Hochberg, U.S. Pat. 3,157,723. The resulting sheet material has a glossy microporous surface. The coated sheet material is subjected to the following tests and the results of these tests are recorded in Table I.

Bally Flexometer Test

The Bally Flexometer provides a rolling, folding type of action in which a metal finger pushes into the sample from the back while the sample is rocked up and down. The samples are inspected after 40,000 flexes. Appearance of cracks in the finish and also failure of actual finish by flaking, generally around the area where the metal finger is pushed into the material, is recorded.

Water vapor permeability determinations

Permeability of the above prepared finished microporous polyurethane sheet material is determined by sealing the sheet on the top of a cup containing $CaCl_2$ and by determining the weight increase of $CaCl_2$ due to moisture pickup in the cup. The cup is stored at 90% R.H. in a constant temperature room at 72° F. for a two-hour period. The water vapor permeability of the sheet is then calculated in grams of water per hour per 100 square meters of material.

Surface tack is the force in grams necessary to separate two surfaces of material placed in contact with each other. The instrument is a Dunlap Tachmeter which consists of a rotatable wheel mounted on a frame assembly which holds a test sample 6 inches x ½ inch around its circumference. A calibrated spring which measures the force necessary to free the test strip on the wheel from a sample is attached to the wheel and the frame of the instrument. An aperture in the base of the frame assembly allows contact between the test strip on the wheel and the sample of material on which the instrument is standing. A scale measuring the extension of the calibrated spring is marked on the cylindrical body of the frame and a rider attached to the frame indicates the tack in grams on the scale after the test samples are separated. The wheel carrying the test strip is rotated 10 times and the instrument is moved over the test sample and an average value is determined to obtain statistically meaningful results.

Gloss Test

The gloss of 60° of each of the coated sheets is measured on a Glossimeter Model J-3, manufactured by Lockwood and McLoric, Inc., in accordance with ASTM Test No. D-523-64-T.

Coating Composition A is applied on the glossy side of the microporous sheet over Coating Composition B by the same procedure as used for applying Coating Composition B. The coated sheet is dried in an oven at about 150° C. to give a clear topcoating of about 0.2 ounce per square yard. The resulting sheet material is measured for water vapor permeability, gloss, surface-tack and flexibility according to the aforementioned methods and the results are recorded in Table I. The novel topcoating composition of this invention gives a material that is essentially tack-free but retains the gloss, flexibility and permeability of the material coated with the conventional Coating Composition B.

EXAMPLE 2

Coating Composition C is prepared by blending Coating Composition B with about 0.2% by weight based on the weight of the polymer of the —NCO terminated polysiloxane having an inherent viscosity at 25° C. of about 0.5. Coating Composition C is applied to the dyed uncoated microporous foundation material described in Example 1 at about 0.2 ounce per square yard (dry weight) using the coating procedure of Example 1. The resulting sheet material has about the same high level of gloss, excellent flexibility and is permeable to water vapor as the material of Example 1 which is coated with Composition B as shown in Table I. The material coated with Composition C is essentially free from surface tack while the material of Example 1 coated with Composition B has a high level of surface tack.

EXAMPLE 3

Coating Composition D is formulated using the same ingredients and formulating procedure as used in Example 1 to form Coating Composition A except a —H terminated polysiloxane having an inherent viscosity at 25° C. of about 0.5 was substituted for the —NCO terminated polysiloxane of Example 1.

The resulting Coating Composition D is coated onto a microporous foundation material that is coated with Composition B as described in Example 1. The resulting sheet material has a coating of about 0.2 ounce per square yard of Composition D (dry basis). The sheet is tested, as in Example 1, for gloss, water vapor permeability, flexibility and surface tack. The results of these tests which are recorded in Table I indicate that the microporous sheet coated with Composition D has similar excellent physical characteristics as the coated microporous sheet material of Example 1.

EXAMPLE 4

Coating Composition E is formulated using the same ingredients and formulating procedure as used in Example 1 to form Coating Composition A except a —$NH_2$ terminated polysiloxane having an inherent viscosity at 25° C. of about 0.5 was substituted for the —NCO terminated polysiloxane of Example 1.

The resulting Coating Composition E is coated onto a microporous foundation material that is coated with Composition B as described in Example 1. The resulting sheet material has a coating of about 0.2 ounce per square yard of Composition E (dry basis). The sheet is tested as in Example 1, for gloss, water vapor permeability, flexibility and surface tack. The results of these tests which are recorded in Table I indicate that the microporous sheet coated with Composition E has similar excellent physical characteristics as the coated microporous sheet material of Example 1.

EXAMPLE 5

Coating Composition F is formulated using the same ingredients and formulating procedure as used in Example 1 to form Coating Composition A except a —OH terminated polysiloxane having an inherent viscosity at 25° C. of about 0.5 was substituted for the —NCO terminated polysiloxane of Example 1.

The resulting Coating Composition F is coated onto a microporous foundation material that is coated with Composition B as described in Example 1. The resulting sheet material has a coating of about 0.2 ounce per square yard of Composition F (dry basis). The sheet is tested, as in Example 1, for gloss, water vapor permeability, flexibility and surface tack. The results of these tests which are recorded in Table I indicate that the microporous sheet coated with Composition F has similar excellent physical characteristics as the coated microporous sheet material of Example 1.

TABLE I

|  | Bally Flex (40,000 flexes) | Water vapor Permeability grams 100M²/hr. | Gloss 60° | Surface tacks (grams) |
|---|---|---|---|---|
| Example 1: |  |  |  |  |
| Coating composition B | 2 | 1,200 | 91 | 65 |
| Coating composition A-B | 2 | 1,200 | 91 | 0 |
| Example 2: |  |  |  |  |
| Coating composition C | 2 | 1,200 | 95 | 0 |
| Example 3: |  |  |  |  |
| Coating composition D | 1 | 1,200 | 93 | 0 |
| Example 4: |  |  |  |  |
| Coating composition E | 1 | 1,500 | 92 | 0 |
| Example 5: |  |  |  |  |
| Coating composition F | 2 | 1,200 | 95 | 0 |

NOTE.—Rating System for Bally Flex:
1=No cracks in finish.
2=Microcracks in finish.
3=Visual cracks and microcracks in finish without finish failure.
4=Severe visual cracks with failure of finish.
5=Severe visual cracks and complete failure of finish with flaking of the finish from the microporous sheet.

What is claimed is:
1. A vapor permeable glossy sheet material consisting essentially of
   (a) a microporous fibrous substrate having adhered thereto;
   (b) a glossy vapor permeable non-porous coalesced coating being substantially free of a light scattering gas/polymer interface and pores visible with a 300× power microscope and which consists essentially of
      (1) about 70–99.9% by weight based on the total weight of the polymer of said coating of an isocyanate terminated polyurethane which is the reaction product of an organic diisocyanate and an active hydrogen containing polymer selected from the group consisting of poly(alkyleneether) glycol and a hydroxy terminated polyester;
      (2) up to 25% by weight based on the total weight of polymer of said coating of a vinyl chloride polymer; and
      (3) 0.1–1.0% by weight based on the weight of the polymer of said coating of a reactive polysiloxane of the formula

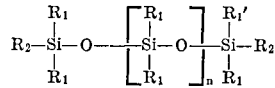

wherein $R_1$ is selected from the group consisting of —H and an alkyl group having 1–4 carbon atoms, and $R_2$ is selected from the group consisting of —NCO, —NH$_2$, —H and —OH, and $n$ is an integer sufficiently large to give said polysiloxane an inherent viscosity of about 0.1 to 2.0 at 25° C.

2. The sheet material of claim 1 in which the microporous fibrous substrate is natural leather and said coating is in firm adherence with the smooth side of said leather substrate.

3. The sheet material of claim 1 in which the microporous fibrous substrate is a synthetic microporous sheet material consisting essentially of a porous non-woven web of synthetic fibers impregnated with a polymeric component having firmly adhered thereto a layer of a microporous polymer and said glossy vapor permeable coating being in firm adherence with said layer of a microporous polymer.

4. The sheet material of claim 3 in which the polymeric component of the microporous layer and the microporous polymeric impregnant of the substrate consists essentially of at least 50% by weight of a polyurethane and up to 50% by weight of a vinyl chloride polymer.

5. The sheet material of claim 4 in which the glossy vapor permeable non-porous coalesced coating being in firm adherence with said microporous layer consists essentially of 90–98% by weight of an isocyanate terminated polyurethane of an aromatic diisocyanate and a poly(alkyleneether) glycol, 2–10% by weight of a vinyl chloride polymer and 0.2–0.5% by weight of a polysiloxane wherein $R_1$ is H.

6. The sheet material of claim 4 in which the glossy vapor permeable non-porous coalesced coating consists of:
   (a) a layer of polyester urethane in firm adherence with said microporous layer which is the reaction product of an arylene diisocyanate, and a hydroxyl terminated polyester; and
   (b) a layer of a non-porous glossy coating composition which is firmly adhered to said layer of polyester urethane and consists essentially of 90–98% by weight of an isocyanate terminated polyurethane of an aromatic diisocyanate and a poly(alkyleneether) glycol, 2–10% by weight of a vinyl chloride polymer and 0.2–0.5% by weight of a polysiloxane wherein $R_1$ is H.

References Cited
UNITED STATES PATENTS 3,298,856  1/1967  Harding _____ 117—76
3,450,791  6/1969  Sekmakas et al.
                              117—161(KP)X
3,481,767  12/1969  Craven et al. _____ 117—76(T)

WILLIAM D. MARTIN, Primary Examiner
R. HUSACK, Assistant Examiner

U.S. Cl. X.R.
117—11, 135.5, 142, 161; 260—827